United States Patent Office 3,272,090
Patented Sept. 13, 1966

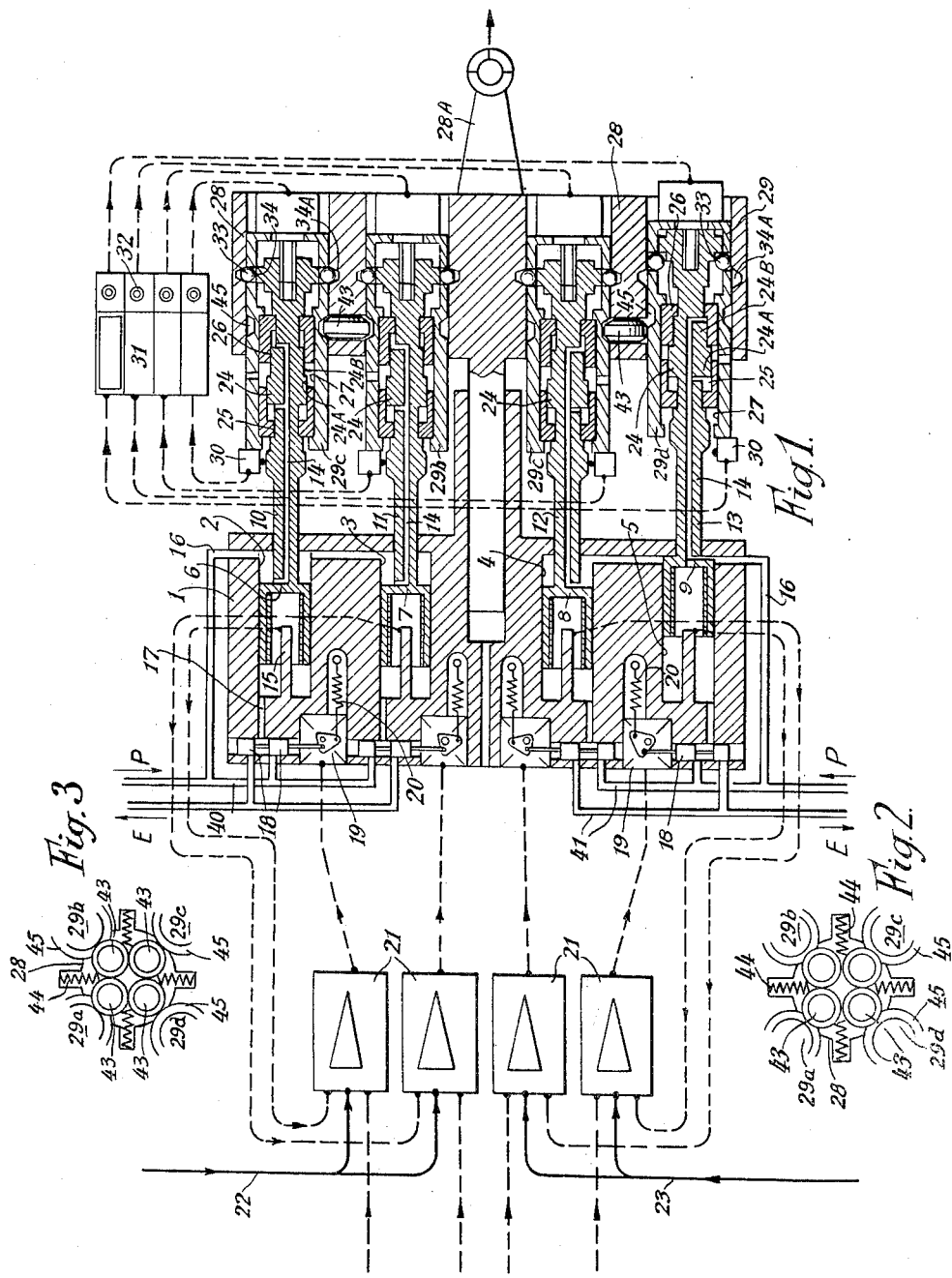

3,272,090
FAIL-SAFE HYDRAULIC ACTUATORS
Stafford Malcolm Ellis, London, England, assignor to
Elliott Brothers (London) Limited, Lewisham,
London, England, a British company
Filed Sept. 23, 1964, Ser. No. 398,612
Claims priority, application Great Britain, Sept. 25, 1963,
37,795/63
7 Claims. (Cl. 92—140)

This invention relates to hydraulic actuators and more particularly to a parallel redundant hydraulic actuator which is capable of disconnecting elements associated with failed systems without the aid of auxiliary electrical or mechanical apparatus or auxiliary hydraulic valves.

Parallel redundant controls are coming into increasing use, particularly for the control of aircraft, but they may usefully be applied in numerous other fields as well. In a redundant control certain parts, or even the whole of the control elements, are duplicated or multiplexed, so that the control will remain operative even if a major element of one of the redundant systems fails.

When, for reasons of safety and reliability, parallel control systems are employed, a variety of problems presents itself. For example, the failure of one control-path, whether due to an internal failure of an external failure, such as the failure of a duplicated power-source, should not seriously affect the other path or paths. Nor should the failure of a command-system with respect to one path result in a major failure of response. Moreover, when there are plural hydraulic units in parallel, and one (or more) has failed, it should not impede the operation of the remaining unit or units. A different kind of contingency should also be anticipated, namely, that in certain events the whole of a path in a parallel system, if it includes some form of positive clutching or mechanical engage-disengage means, may become disengaged; or one or more paths may be disengaged in such a way as to result in an over-load actuation by the remainder. The invention aims at abating the problems (of which the foregoing is only a brief outline) which confront the designer of a parallel redundant hydraulic actuator system.

The invention is applicable in cases in which two or more parallel hydraulic motors commonly act on an output member in the manner of an actuator.

One object of the invention is to provide a parallel redundant hydraulic actuator system in which units may be disengaged as they fail, but when only two or more active units are left they are automatically locked together.

Another object is to provide an actuator system in which the piston rods of the actuator units are connected to a common output member through a mechanical clutch and a resilient coupling (which is preferably hydraulic) in such a manner that if the resilient coupling is collapsed the clutch is released.

Other and further objects will become apparent from the definition and description of the invention given hereinafter.

According to this invention there is provided a parallel redundant hydraulic actuator system having three or more control paths each including an actuator unit in which any one of the actuator units may be disengaged as the result of a malfunction or other event, comprising latching means associated with all the actuators, so arranged that when a predetermined number of actuator units becomes disengaged the disengagement of the last of the predetermined number causes the latching means to interlock at least two remaining actuator units positively, so that the disengagement of a further unit, even if it were initiated, would be frustrated.

The invention further comprises an arrangement in which the actuator units are symmetrically disposed about an axis, the disengagement of the last of the predetermined number of units causing the latching means to move laterally of the axis to interlock at least two remaining units. The preferred arrangement involves four units arranged around a common axis in which there are four units, the latching means being such that upon disengagement of the second of any two units the remaining two units are interlocked. This has a certain statistical significance in that it is thereby ensured that at least two of the actuator units must always be coupled for operation. It also caters for the possibility that all four actuator units might (otherwise) disengage at once. It further results from the arrangement that if, when the system is operating on two units only and a third one fails, the failure will be non-violent because the now-failed unit remains connected by the latching means.

The invention further includes certain refinements which minimise or eliminate backlash; means whereby a disengaged unit may be easily re-engaged; a device of a "fail-safe" kind covering valve-operating servo-motors and a complete system of actuation using two independent electrical supply arrangements and two independent hydraulic supply arrangements in which a fault of either type can be cleared, in the sense that the required controllable actuation continues visibly.

The diagrammatic drawings herewith illustrate the invention. FIGURE 1 shows schematically a four-unit actuator which in practice will have the units symmetrically around an axis (as can be perceived from the scrap-view FIGURE 2) but which, for clarity, has been drawn as a flat development of the units unwrapped from their axis of symmetry. FIGS. 2 and 3 are similar diagrammatic cross-sectional views respectively showing the positions of the latching discs unpositively interlocked with the actuator units and positively interlocking two engaged units when two units have been disengaged.

It is to be understood that the illustration is not of a complete system but it may be regarded, in the light of the aforementioned application, as representative of the main hydraulic part with indication of the accessory electric circuitry.

The main part of the actuator is a cylinder block 1 having four parallel cylinders 2, 3, 4, 5. In these are double-acting pistons 6, 7, 8, 9, respectively, which have piston rods 10, 11, 12, 13. Each of these rods has a fluid passage, these being designated by 14, later referred to. Each of the pistons 6, 7, 8, 9 has within its hollow formation an electrically-operating position indicator of a kind known per se, not forming part of the invention, and indicated for reference purposes at 15.

Each of the cylinders, e.g., 2, has a port and conduit 16 at one end and another 17 at the other end (seen at the upper part of FIGURE 1 in respect of cylinder 2). The flow of pressure-fluid to and from the two ends of the cylinders, is controlled by a spool-valve 18 of known type. Each spool valve 18 is operated in two-way sense by an electric torque servo-motor, indicated at 19, and the motion is urged unidirectionally by a spring 20. The motors 19 are controlled by electrical means indicated at 21, which also responds to the position signals from 15.

One pair of the hydraulic units so constituted (the upper pair in the drawing) has a first electrical supply via line 22 and the second pair of the hydraulic units (the lower pair in the drawing) has a second, independent, electrical supply via line 23. There are, therefore, two independent electric supply circuits, each serving two of the hydraulic units.

The piston rods 10, 11, 12, 13, are connected directly to slide elements designated 24, which operate with appropriate fluid-tightness, to slide in a pair of opposed ferrules 25, 26, which are themselves slidable in a cylindrical bore 27 of which there are (correspondingly) four in an output block 28 which is connected as by a part 28a to the thing to be actuated, e.g., a control surface of an aircraft.

The elements 24 have two enlarged annular piston parts 24a, 24b, which are of different effective area. These operate, as pistons, in the ferrules 25, 26, respectively. It can be seen that the ferrules and their respective pistons enclose pressure spaces and these are connected openly to the fluid passages 14.

The bores 27 are in sleeves 29a, 29b, 29c, and 29d. These sleeves are slidable in the block 28, subject to what follows.

Between the elements 24 and the sleeves 29 there are microswitch or other electrical contact devices, indicated at 30, operated by relative sliding of 24 and 29 and so circuited as to give a signal (e.g., a lamp) at 31.

In apertures in the sleeves 29 are caged balls 33 which normally are held in an outward and engaged position by virtue of an enlargement 34 on the element 24 (see the top, second and third units in FIGURE 1). The balls 33 are normally engaged in recesses 34a in the block 28, and form a positive clutch between 29 and 28 except if there has been relative movement (occasioned by failure) between 24 and 29 such that, as shown in the bottom unit of the figure, the enlargement 34 releases the balls inwards.

The assembly of elements 24, 25, 26, 29 constitute in effect a hydraulic coupling for bi-directional thrust between the rods 10 and the block 28. The maximum thrust of the actuator system is therefore the sum of the thrusts exerted by the pistons 6, 7, 8 and 9. However, if there be a failure, either hydraulically or electrically, in respect of any one unit, the thrust then exerted through 28a will still be the sum of the thrusts of the remaining three units. Should, however, there be a failure of (for example) one electrical source 22 or 23, the two unaffected actuator units will still exert the sum of their thrusts through 28a.

There are also two independent hydraulic sources. The upper pair of units is supplied and exhausted by ducts 40 from one source, and the lower pair of ducts 42 from a second source. If one source fails, two units will still operate normally.

However, the invention contemplates various permutations of failure and provides that, if one disengagement of the balls 33 occurs in one unit, adjacent units will then be so conditioned that they remain interlocked, and the following description shows how this is achieved.

Located in the block 28 are bevel-edged latch discs 43. These are four in number and are symmetrically arranged around the same axis as the units, as can be seen from FIGURE 2. The discs 43 are collectively urged inwards by springs 44 and they contact each other edgewise. The discs are positioned so as normally to register with bevelled grooves 45 in the sleeves 29a, 29b, 29c, and 29d, whilst being laterally shiftable (i.e., in their own plane). The shifting of a disc 43 is caused when one sleeve 29 is released by the associated ring of balls 33 and there is relative sliding movement between that sleeve and the block 28, so that the associated disc 43 is forced laterally out of its groove 45. The lateral movement is produced by the bevelling of the outer diameter of the disc and the obliquity of the groove walls. The diameter of the discs and the depth of the grooves are so chosen that, when normally engaged, the discs only enter the grooves to a part of their depth. If one failure occurs, lateral movement of the disc concerned causes the other discs to enter the respective grooves more deeply, but it is still possible for a second disc to be moved laterally if a second failure occurs. Upon the occurrence of a second failure, however, and the consequent lateral movement of a second disc, the remaining discs are forced to the bottom of the respective grooves, so that the associated sleeves 29 are inseparably latched together, irrespective of the positions of their ball clutches.

The normal operation of the complete system is as follows. Individual and identical demand signals are supplied to the four electrical means 21, which in turn provide power signals for application to the servo-motors 19. These apply appropriate movements to the spool valves 18, which all move in one direction or the other as required. The full hydraulic pressure applied over the lines 40 or 41 marked P is conducted via the conduits 16 to the ends of the hydraulic cylinders 2 through which the piston rods project. Due to the movement of the spool valves either the high pressure line 40 or 41 marked P, or the exhaust line 40 or 41 marked E, is connected to the conduits 17. If the movement of the spool valves 18 is such as to connect the lines marked P to the conduits 17 then the actuator pistons 6, 7, 8 and 9 all move to the right in FIGURE 1 because it is arranged that the area of the pistons acted upon at the left-hand sides of the pistons is approximately double the area of the annular areas acted upon by the pressure at the right-hand ends of the pistons. That is to say, the cross-sectional area of the piston rods is approximately half the cross-area section of the pistons. Hence, if the line pressure acts upon both ends of the pistons they will always move to force the piston rods outwardly, and as they move hydraulic pressure fluid flows through the conduits 16 from the right-hand ends of the cylinders back to the pressure supply lines P. On the other hand, if the spool valves 18 are opened in such a direction as to connect the conduits 17 to the lines 40 or 41 marked E, then the pressure fluid acting at the right-hand ends of the pistons 6, 7, 8 and 9 moves them all to the left. The instantaneous position of each piston in either direction is picked off by the position pick-offs 15 and a position signal is transmitted back to the electrical means 21 in each case, so that when each actuator piston has carried out the required movement, the position signal, which opposes the input signal, balances the input signal from the demand means, so that the output signal from the electrical means 21 to the servo-motors 19 is reduced to zero. This kind of actuator system is in itself known.

The full hydraulic pressure is always available at the right-hand ends of the cylinders 2, and this pressure is transmitted through the passages 14 and into the spaces inside the ferrules 25 and 26, and acts to force the ferrules apart until they abut shoulders formed at appropriately spaced points on the slide elements 24. The sleeves 29 are also formed with internal shoulders which are spaced by precisely the same distance as the external shoulders just referred to on the slide elements. Consequently, when the ferrules 25 and 26 are forced apart they lock the sleeves 29 to the slide elements 24 on the piston rods 10 substantially without backlash. However, if the hydraulic pressure should fail due, for example, to a pump failure, the force holding the ferrules 25 and 26 apart in the two units concerned disappears, so that the hydraulic couplings between the slide elements 24 and the respective sleeves 29 collapse, allowing the sleeves 29 to move freely with respect to the slide elements 24 and piston rods 10. With no hydraulic pressure there are no further movements of the piston rods 10 in response to commands from the electrical means 21, but the sleeves 29 are moved with the output member 28. Consequently the apertures in the sleeves 29 carrying the balls 33 move out of alignment with the respective enlargements 34 and the balls 33 are allowed to move inwardly and disengage themselves from the output member 28.

It will now be assumed that the hydraulic pressure is maintained but one of several other types of failure occurs. The first possibility is a failure in the demand signal itself. Consequently the associated electrical means 21 of the failed control does not receive signals which correspond with the signals applied to the other electrical means 21. The servo-motor 19 of the failed control receives no power to cause it to execute any movement subsequent to the failure. The other three units function normally and move the output member 28. The actuator piston of the failed unit remains in the position in which it was placed by the last demand signal preceding the failure. The movement of the output member 28 under the full power of the properly operating actuators compels the sleeve 29 of the failed system to move with it and forces one or other of the ferrules 25 or 26 to move with respect to the associated slide element 24. It will be evident that since the area of the annulus on which the hydraulic pressure acts inside the ferrule is quite small the three properly functioning actuators (or even one actuator on its own) can easily overcome the resistance to movement of the ferrule concerned, so the sleeve 29 of the failed unit is forced to move with the output member. Since, however, the respective enlargement 34 remains stationary with the piston of the failed unit the orifices containing the balls 33 are uncovered and the balls are forced inwardly so that the clutch is again disengaged. A similar effect results from a failure of the servo-motor 19 of any of the control parts, or an electrical failure of the position indicator 15, or a mechanical jamming of an actuator piston in its cylinder.

From the foregoing description it will be clear that the effect of the failure, for any reason, of any two of the actuator units, and the consequent release of the respective ball clutches, results in the remaining two units to be locked together. A failure in one unit is further represented in the lowermost unit of FIGURE 1 by the position of its spool valve 18 and of the output arm of its servo-motor 19. In FIG. 2 all four discs 43 are shown partially engaged in their grooves 45 representing the condition under which none of the actuators has disengaged. FIG. 3 illustrates the condition in which the two lower actuators have disengaged forcing their discs 43 out of the grooves 45 in sleeves 29c and 29d and into positive interlocking engagement in the grooves of sleeves 29a and 29b of the upper pair of actuators.

There can never be fewer than two actuator units coupled to the output part 28a. If there are only two left and one of these fails, the other—though probably capable of doing the required work by itself—also has to move the failed one, so that possible violent reaction to this further thrust failure is checked.

The construction above described may be considerably changed. For example, the hydraulic couplings may be arranged around and outside the actuator units proper. Again, the ball clutches may engage differently, for example, in grooves in the block.

The differential areas of the pistons of the couplings may be chosen so that the "break-out" forces may be directionally different and minimise backlash by erecting a directional pre-load.

The ball clutches may be arranged so that, by relatively rotating the parts, they are easily re-engaged after freeing so that, even in flight, it can be ascertained whether disengagement resulted from a real failure or merely from some transient occurrence. This is achieved by using one of the switches 32 which are conveniently mounted alongside corresponding signals 31.

The spring loadings on the valve servo-systems are provided to take care of an electrical power failure, in that their effect may be opposed so as to open one spool valve to pressure and the other to exhaust.

I claim:
1. A parallel redundant hydraulic actuator system comprising three or more control paths each including an actuator unit which includes means whereby any one of the actuator units may be disengaged as the result of a malfunction or other event, latching means including a plurality of members each unpositively interlocked with an associated one of said actuators, said members being movable to unlock from its associated unit upon disengagement thereof, and means for transmitting movement of one member to the other members and effective upon the disengagement of the last of a predetermined number of actuator units to move said members to positively interlock with at least two remaining engaged units.

2. A parallel redundant hydraulic actuator system having three or more control paths each including an actuator unit which includes means whereby any one of the actuator units may be disengaged as the result of a malfunction or other event, comprising at least three actuator units symmetrically disposed about an axis, latching means including a plurality of members each unpositively interlocked with an associated one of said actuators, said members being movable laterally of said axis, means holding said members each in peripheral contact with the adjacent two members and including means biasing said members toward said axis, and means operated by the disengagement of the last of a predetermined number of actuator units to move said members laterally to positively interlock at least two remaining engaged units.

3. A system as claimed in claim 2 in which said members of the latching means comprises a plurality of discs lying with their axes parallel to said axis and having bevelled edges, an element of each unit being formed with a groove having oblique walls corresponding to said bevelled edges, and forming parts of said means to move the discs laterally the grooves and discs being so dimensioned that said discs normally only enter said grooves to a part of their depth, a malfunction in any one unit and the consequent failure of the grooved element thereof to move with the corresponding elements of the other units cause the disc associated with the failed unit to be pushed out of its groove, the displaced disc forcing the other discs to enter their associated grooves more deeply, the displacement of the disc associated with the last of said predetermined number causing the discs associated with the remaining units to be pushed to the full depth of their grooves, whereby the remaining actuator units are inseparably interlocked.

4. A system as claimed in claim 2 comprising a common output member to which the piston rods of all said actuator units are coupled, and a clutch for each actuator to couple the piston rod thereof to said common output member.

5. A system as claimed in claim 4 comprising a slide member rigid with each piston rod, an intermediate sleeve which contains said clutch between each slide member and said output member, and a resilient coupling between each slide member and the associated intermediate sleeve so arranged that relative movement between the piston rod and the intermediate sleeve allows the clutch to disengage.

6. A system as claimed in claim 4 in which each clutch comprises a ring of balls carried in the associated intermediate sleeve, the intermediate sleeve being slidable longitudinally in said output member, the balls projecting into an internal groove in the output member and being retained in position by an enlargement formed on the associated slide member.

7. A system as claimed in claim 5 in which said resilient coupling is hydraulic and comprises two ferrules each having a stepped bore, said ferrules being slidably mounted in opposed relation on corresponding diameters of the associated slide member, a duct through each piston rod and slide member through which the hydraulic line pressure is led to the space between the two diameters of each ferrule so that said ferrules are formed in opposite directions, shoulders on the slide members against which the opposite ends of the two ferrules abut, the ferrules engaging the inner diameter of the intermediate sleeve, and inwardly projecting shoulders in the intermediate sleeve spaced by the same distance as the shoulders of the slide member, whereby with application of hydraulic pressure the slide member and the intermediate sleeve are coupled together without axial play by the ferrules, the failure of the hydraulic pressure or the application of a load above a certain level causing the coupling to collapse.

References Cited by the Examiner

UNITED STATES PATENTS

| | | | |
|---|---|---|---|
| 2,821,068 | 1/1958 | Orloff et al. | 91—363 |
| 3,095,783 | 1/1963 | Flindt | 91—1 |
| 3,198,082 | 8/1965 | Kerris | 91—1 |

MARTIN P. SCHWADRON, *Primary Examiner.*

SAMUEL LEVINE, *Examiner.*

I. C. COHEN, *Assistant Examiner.*